(12) United States Patent
Fu

(10) Patent No.: US 11,333,781 B2
(45) Date of Patent: May 17, 2022

(54) SIGNAL RECOVERY DURING SIMULTANEOUS SOURCE DEBLENDING AND SEPARATION

(71) Applicant: BP Corporation North America Inc., Houston, TX (US)

(72) Inventor: Kang Fu, Katy, TX (US)

(73) Assignee: BP CORPORATION NORTH AMERICA INC., Houston, TX (US)

(\*) Notice: Subject to any disclaimer, the term of this patent is extended or adjusted under 35 U.S.C. 154(b) by 150 days.

(21) Appl. No.: 16/812,879

(22) Filed: Mar. 9, 2020

(65) Prior Publication Data

US 2020/0292725 A1 Sep. 17, 2020

Related U.S. Application Data

(60) Provisional application No. 62/819,145, filed on Mar. 15, 2019.

(51) Int. Cl.
  *G01V 1/30* (2006.01)
  *G01V 1/36* (2006.01)
  *G06T 11/00* (2006.01)

(52) U.S. Cl.
  CPC .............. *G01V 1/307* (2013.01); *G01V 1/364* (2013.01); *G06T 11/00* (2013.01);
  (Continued)

(58) Field of Classification Search
  CPC ................................ G01V 1/307; G01V 1/364
  (Continued)

(56) References Cited

U.S. PATENT DOCUMENTS

| 8,295,124 B2 | 10/2012 | Abma |
| 9,678,233 B2 | 6/2017 | Abma et al. |

(Continued)

FOREIGN PATENT DOCUMENTS

EP 2592439 A2 5/2013

OTHER PUBLICATIONS

Abma, R.L. et al, High Quality Separation of Simultaneous Sources by Sparse Inversion, 72nd EAGE Conference and Exhibition 2010.

(Continued)

*Primary Examiner* — Ricky Go
(74) *Attorney, Agent, or Firm* — Conley Rose, P.C.

(57) ABSTRACT

A device may include a processor that may recover the signals misallocated in the deblending process of seismic data acquired with simultaneous sources. The processor may update the primary signal estimate based at least in part on a separation operation that separates coherence signals from noise signals in an output associated with the residual determined to be remaining energy for separation. The processor may be incorporated into the iterative primary signal estimate of the deblending process or be applied towards preexisting deblending output. In response to satisfying an end condition, the processor may transmit a deblended output that includes the weak coherence signals recovered from the misallocation or error in the primary signal estimate. The processor may also transmit the deblended output for use in generating a seismic image. The seismic image may represent hydrocarbons in a subsurface region of Earth or subsurface drilling hazards.

20 Claims, 8 Drawing Sheets

(52) U.S. Cl.
CPC ............... *G01V 2210/1234* (2013.01); *G01V 2210/3246* (2013.01); *G01V 2210/6161* (2013.01); *G01V 2210/63* (2013.01)

(58) Field of Classification Search
USPC .......................................................... 702/14
See application file for complete search history.

(56) References Cited

U.S. PATENT DOCUMENTS

| | | | |
|---|---|---|---|
| 2015/0241587 A1 | 8/2015 | Baardman | |
| 2015/0276958 A1* | 10/2015 | Khalil | G01V 1/36 702/17 |
| 2016/0077231 A1 | 3/2016 | Rohnke et al. | |
| 2016/0245943 A1* | 8/2016 | Rohn | G01V 1/364 |
| 2020/0073001 A1* | 3/2020 | Bekara | G01V 1/247 |
| 2020/0116885 A1* | 4/2020 | Abma | G01V 1/003 |

OTHER PUBLICATIONS

Abma, R. et al, Independent simultaneous source acquisition and processing, Geophysics, 80, No. 6, 2015.
How, D. et al, Independent Simultaneous Sweeping a method to increase the productivity of land seismic crews, 78th Annual International Meeting, SEG, 2008.
Moore, I et al, Simultaneous source separation using dithered sources, 78th Annual International Meeting, SEG, 2008.
Moore, I et al, Simultaneous Sources Processing and Applications, 72nd EAGE Conference and Exhibition, 2010.
International Search Report and Written Opinion dated Jun. 19, 2020, for PCT/US2020/021707, filed on Mar. 9, 2020.
Araz Mahdad et al: Separation of blended data by iterative estimation and subtraction of blending interference noise, Geophysics, Society of Exploration Geophysicists, us, vol. 76, No. 3, May 1, 2011 (May 1, 2011), pp. Q9-QI7, XP001574345.

* cited by examiner

SIGNAL RECOVERY DURING SIMULTANEOUS SOURCE DEBLENDING AND SEPARATION

This application claims priority to U.S. Provisional patent application No. 62/819,145, filed with the United States Patent and Trademark Office on Mar. 15, 2019 and entitled "Signal Recovery During Simultaneous Source Deblending and Separation," the disclosure of which is incorporated herein by reference in its entirety.

BACKGROUND

The present disclosure relates generally to seismic image generation, and more specifically, to signal recovery techniques to be used as part of existing deblending operations and separation operations to improve amounts of coherent signals recovered during simultaneous source acquisition.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending acoustic energy down into the ground and recording the reflected acoustic energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave, acoustic wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

Over time, as hydrocarbons are being extracted from the subsurface region of the Earth, the location, saturation, and other characteristics of the hydrocarbon reservoir within the subsurface region may change. As such, it may be useful to determine how the image or map of the subsurface region changes over time, such that the operations related to extracting the hydrocarbons may be modified to more efficiently extract the hydrocarbons from the subsurface region of the Earth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic acquisition utilizing sources and receivers may be useful in the generation of, for example, seismic images. Seismic images may be used, for example, in the determination of hydrocarbon deposits (e.g., areas within a subsurface that contain hydrocarbons) and/or subsurface drilling hazards. Seismic images are generally produced based on seismic waveforms produced by a source that reflect off regions within a subsurface and are received by receivers. The seismic image may be constructed using a high resolution seismic velocity model, such as full waveform inversion (FWI) model a tomography model or the like applied, for example, via a velocity model builder. The seismic velocity model may include data indicative of a change in velocity of the seismic waveforms during propagation through the subsurface region. The source that produces the seismic waveforms may be an active source (e.g., anthropogenic sources of seismic waves such as explosives or airguns), or a passive source (e.g., non-anthropogenic such as waves or wind). Certain techniques employ active sources due to the resulting high signal-to-noise ratio (SNR) of the seismic waveforms. Passive sources may complement active source seismic surveys. For example, passive sources may be utilized in the generation of velocity models of a near surface region (e.g., less than approximately 500 meters (m) below the surface of the Earth and/or a seafloor).

In addition to the examples provided above, image and/or data registration techniques may be used for various applications in seismic data processing, as described herein. For example, the systems and methods described below may be used for signal recovery associated with returned signals received during simultaneous source data acquisition. To elaborate, sometimes simultaneous sources are used to gather data to generate a seismic image. Simultaneous sources may provide many benefits in the generation of a seismic image, such as improved efficiency, improved resulting seismic images, and reduced cost, relative to non-simultaneous sources. However simultaneous sources sometimes lead to particular challenges too, such as the signal interferences between strong-coherence signals and weak-coherence (e.g., not coherent, non-coherent, lacking complete energy coherence, deep reflection energy) signals may lead to incomplete separation, wrong (e.g., incorrect) separation, severe distortion of the weak-coherence signals, or the like.

In non-simultaneous source acquisition, seismic sources may be shot with long enough time intervals to cause many or all desired seismic signals generated from previous shots to be recorded before the next shot is fired. However, in simultaneous source acquisition, the time intervals may be smaller than the time used to record a complete shot. Thus, seismic signals generated from neighboring shots may blend together.

The recorded seismic data is typically sorted into two-dimension (2-D), three-dimension (3-D), or even higher dimension traces for processing. Due to the continuity of geology of the Earth, the Earth-reflected signals may be coherent in the domain of 2-D, 3-D, or higher dimensions. However, the blending noise, which refers to signals received during data collection periods that interfere with a current data collection period, may be read as noise in certain 2-D, 3-D, or higher dimension domains due to the spatial misalignment in the source excitation time, despite being the replica of a primary signal (e.g., coherent energy or signal) for a subsequent input data (e.g., input seismic data) collection period. Deblending (used interchangeable herein with "deblending operation" or "deblending operations") refers to the techniques used to separate the signals such that signals generated by each shot are placed into the right data collection periods. In this way, the blending noise may refer to signals misplaced that are to be recovered and associated with their corresponding primary signals (e.g., corresponding coherent energy in a subsequent data collection period). However, when the seismic acquisition is less than ideal, weak-coherency signals may be contaminated by strong blending noise during the deblending operations. It may be desired to develop and/or improve techniques associated with coherent energy (e.g., coherent signal) recovery to suitably gather and associate the blending noise with its corresponding primary signals.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Seismic data may provide valuable information with regard to the description such as the location and/or change of hydrocarbon deposits within a subsurface region of the Earth. Improvements to the processing of the seismic data and subsequent image generation may be made through the use of weak coherence signal recovery techniques. As described herein, these improvements include changes to typical operation to enhance recovery operations. Enhanced recovery operations may include incrementally recovering coherent energies associated with weak coherence signals from seemingly non-coherent energies generally associated with seismic data noise.

Figure 1:
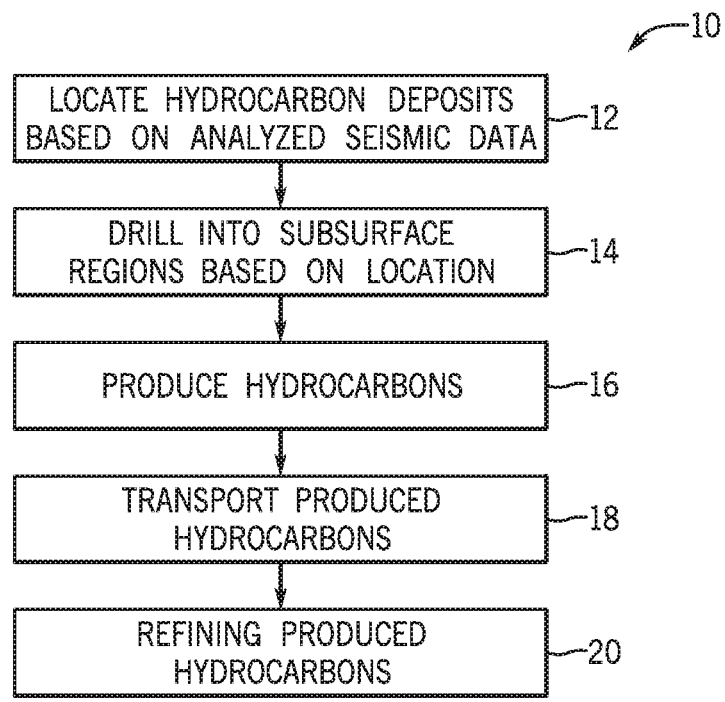
FIG. 1 illustrates a flow chart of various processes that may be performed based on analysis of seismic data acquired via a seismic survey system, in accordance with embodiments presented herein.
Figure 2:
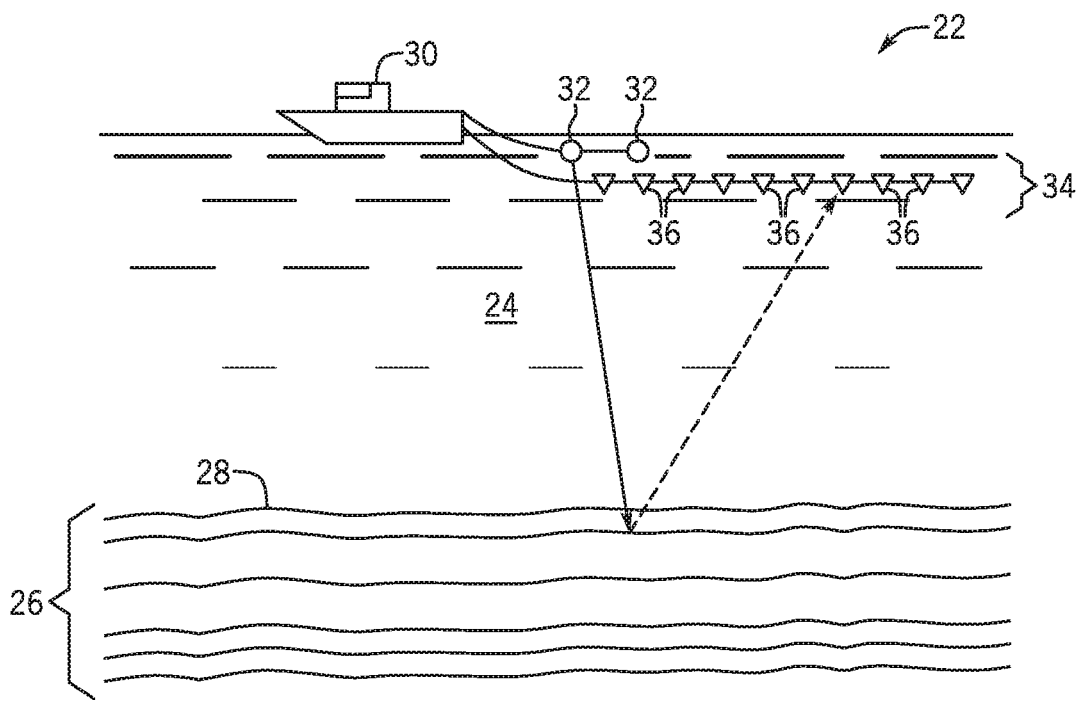
FIG. 2 illustrates a marine survey system in a marine environment, in accordance with embodiments presented herein.
Figure 3:
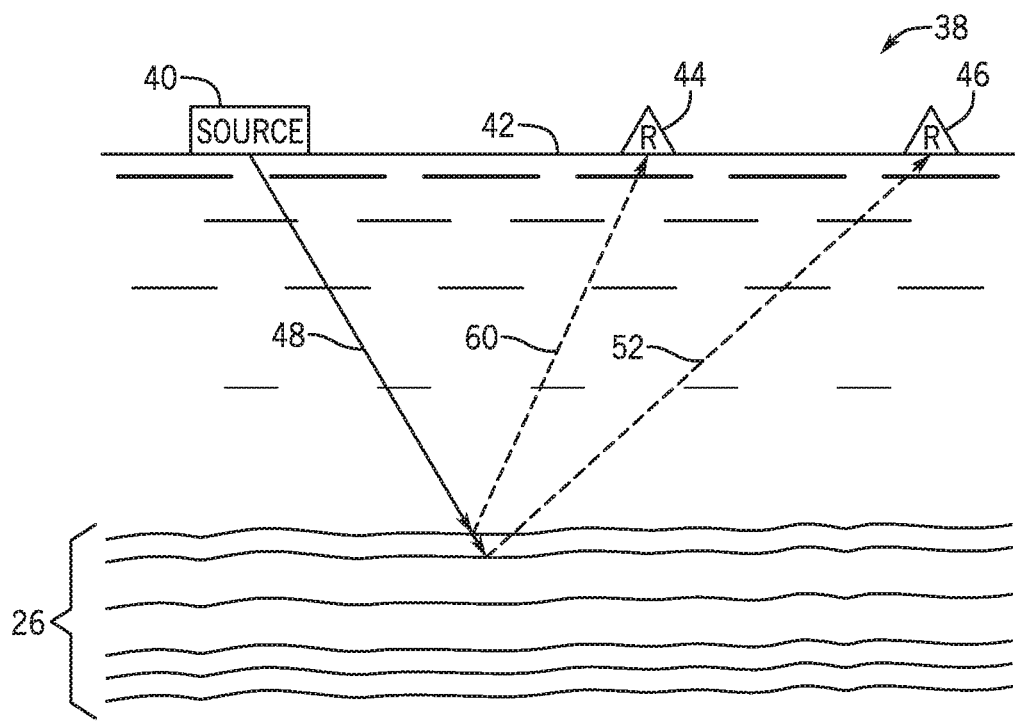
FIG. 3 illustrates a land survey system in a land environment, in accordance with embodiments presented herein.

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and use the results of the seismic data analysis (e.g., seismogram, map of geological formations, or the like) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it is noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries, storage facilities, processing sites, and the like via transport vehicles, pipelines, and the like. At block 20, the produced hydrocarbons may be processed according to various refining procedures to develop different products using the hydrocarbons.

It is noted that the processes discussed with regard to the method 10 may include other suitable processes that may be based on the locations and properties of hydrocarbon deposits as indicated in the seismic data acquired via one or more seismic survey. As such, it may be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a streamer 34, a receiver 36, and/or other equipment that may assist in acquiring seismic images representative of geological formations within a subsurface region 26 of the Earth. The vessel 30 may tow the seismic source 32 (e.g., an airgun array) that may produce energy, such as acoustic waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations (e.g., salt domes, faults, folds, or the like) within the subsurface region 26. Additionally, although the description of the marine survey system 22 is described with one seismic source 32 (represented in FIG. 2 as an airgun array) and one receiver 36 (represented in FIG. 2 as a plurality of hydrophones), it is noted that the marine survey system 22 may include multiple seismic sources 32 and multiple seismic receivers 36. In the same manner, although the above descriptions of the marine survey system 22 is described with one seismic streamer 34, it is noted that the marine survey system 22 may include multiple seismic streamers 34. In addition, additional vessels 30 may include additional seismic sources 32, streamers 34, and the like to perform the operations of the marine survey system 22.

FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a (land-based) seismic source 40 and a (land-based) seismic receiver 44. In some embodiments, the land survey system 38 may include one or more multiple seismic sources 40 and one or more seismic receivers 44 and 46. Indeed, for discussion purposes, FIG. 3 includes a seismic source 40 and two seismic receivers 44 and 46. The seismic source 40 (e.g., seismic vibrator) may be disposed on a surface 42 of the Earth above the subsurface region 26 of interest. The seismic source 40 may produce energy (e.g., sound waves, seismic waveforms) directed at the subsurface region 26 of the Earth. Upon reaching various geological formations (e.g., salt domes, faults, folds) within the subsurface region 26 the energy output by the seismic source 40 may be reflected off of the geological formations and acquired or recorded by one or more land-based receivers (e.g., 44 and 46).

In some embodiments, the seismic receivers 44 and 46 may be dispersed across the surface 42 of the Earth to form a grid-like pattern. As such, each seismic receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first seismic receiver 44 may receive the reflection of the seismic waveform 48 off of one geological formation and a second receiver 46 may receive the reflection of the seismic waveform 48 off of a different geological formation. As such, the seismic first receiver 44 may receive a reflected seismic waveform 50 and the second receiver 46 may receive a reflected seismic waveform 52.

Figure 4:
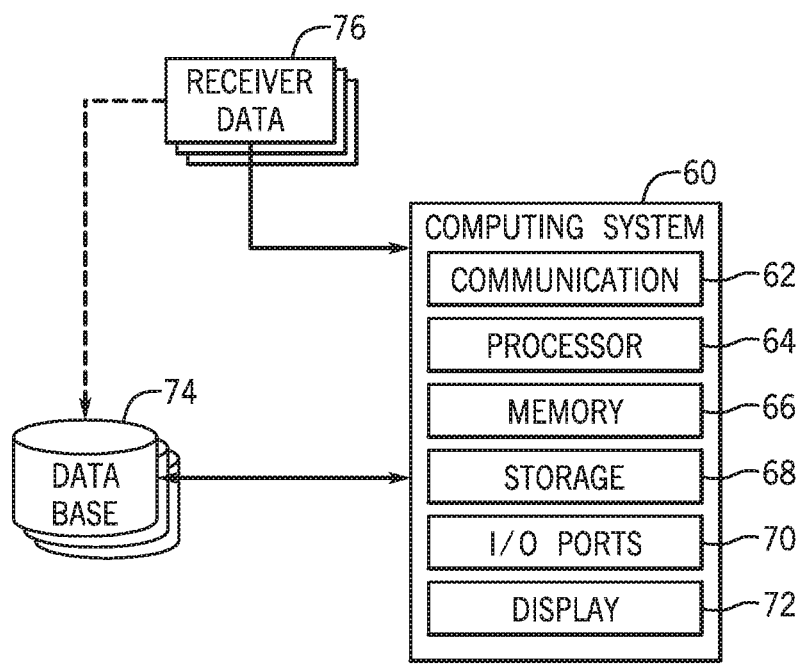
FIG. 4 illustrates a computing system that may perform operations described herein based on data acquired via the marine survey system of FIG. 2 and/or the land survey system of FIG. 3, in accordance with embodiments presented herein.

Regardless of how the seismic data is acquired, a computing system (e.g., for use in conjunction with block 12 of FIG. 1) may analyze the seismic waveforms acquired by the (marine-based) seismic receivers 36 or the (land-based) seismic receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of the geological formations within the subsurface region 26.

Referring now to FIG. 4, the computing system 60 may include a communication component 62, a processor 64, memory 66 (e.g., a tangible, non-transitory, machine readable media), storage 68 (e.g., a tangible, non-transitory, machine readable media), input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., seismic data, seismograms) previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code or instructions to implement the methods described herein. The processor 64 may also include multiple processors that may perform the operations described below. The memory 66 and the storage 68 may be any suitable article of manufacture serving as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also store the data, analysis of the data, the software applications, and the like. The memory 66 and the storage 68 may represent tangible, non-transitory, computer-readable media (e.g., any suitable form of memory or storage) that may store the processor-executable code used by the processor 64 to perform various techniques described herein. It may be noted that tangible and non-transitory merely indicates that the media is tangible and is not a signal.

The I/O ports 70 are interfaces that may couple to other peripheral components such as input devices (e.g., keyboard, mouse), sensors, input/output (I/O) modules, and the like. The I/O ports 70 may enable the computing system 60 to communicate with the other devices in the marine survey system 22, the land survey system 38, or the like.

The display 72 may depict visualizations associated with software or executable code processed via the processor 64. In one embodiment, the display 72 may be a touch display capable of receiving inputs from a user of the computing system 60. The display 72 may also be used to view and analyze results of any analysis of the acquired seismic data to determine the geological formations within the subsurface region 26, the location and/or properties of hydrocarbon deposits within the subsurface region 26, and/or the like. The display 72 may be any suitable type of display, such as a liquid crystal display (LCD), plasma display, or an organic light emitting diode (OLED) display. In addition to depicting the visualization described herein via the display 72, it may be noted that the computing system 60 may also depict the visualization via other tangible elements, such as paper (e.g., via printing), or the like.

With the foregoing in mind, the present techniques described herein may also be performed using a supercomputer employing multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display 72 since the display 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, or the like regarding the subsurface region 26.

Although the components described above have been discussed with regard to the computing system 60, it may be noted that similar components may make up the computing system 60. Moreover, the computing system 60 may also be part of the marine survey system 22 or the land survey system 38, and thus may monitor and/or control certain operations of the seismic sources 32 or 40, the receivers 36, 44, 46, or the like. Further, it may be noted that the listed components are provided as example components and the embodiments described herein are not to be limited to the components described with reference to FIG. 4.

In some embodiments, the computing system 60 (e.g., the processor 64 operating in conjunction with at least one of the memory 66 or the storage 68) may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that may extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of Earth layers present beneath the recording locations. A 3-D seismic survey, on the other hand, may create a data "cube" or volume that may correspond to a 3-D picture of the subsurface region 26.

In addition, a four-dimension (4-D or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may include a very large number of individual seismic recordings (e.g., traces, seismic traces). As such, the computing system 60 analyze the acquired seismic data and obtain an image representative of the subsurface region 26. The computing system 60 may use the image to determine locations and/or properties of hydrocarbon deposits. To that end, a variety of seismic data processing algorithms may be used to remove noise from the acquired seismic data, migrate the pre-processed seismic data, identify shifts between multiple seismic images, align multiple seismic images, or the like.

After the computing system 60 analyzes the acquired seismic data, the results of the seismic data analysis (e.g., seismogram, seismic images, map of geological formations, or the like) may be used to perform various operations within the hydrocarbon exploration and production industries. In some embodiments, the computing system 60 may provide an indication of the presence of hydrocarbons. As such, the computing system 60 may provide an indication of the subsurface region 26 that is likely to have hydrocarbons and provide a position (e.g., coordinates or a relative area) of regions that include the hydrocarbon deposits and/or (in some cases) subsurface drilling hazards. In other embodiments, the image generated in accordance with the present techniques may be displayed via the display 72 of the computing system 60, thus facilitating locating a region by a user of the computing system 60. Accordingly, the acquired seismic data may be used to perform the method 78 of FIG. 5 that details an example of the various processes that may be undertaken based on the analysis of the acquired seismic data to provide a seismic data analysis.

Figure 5:
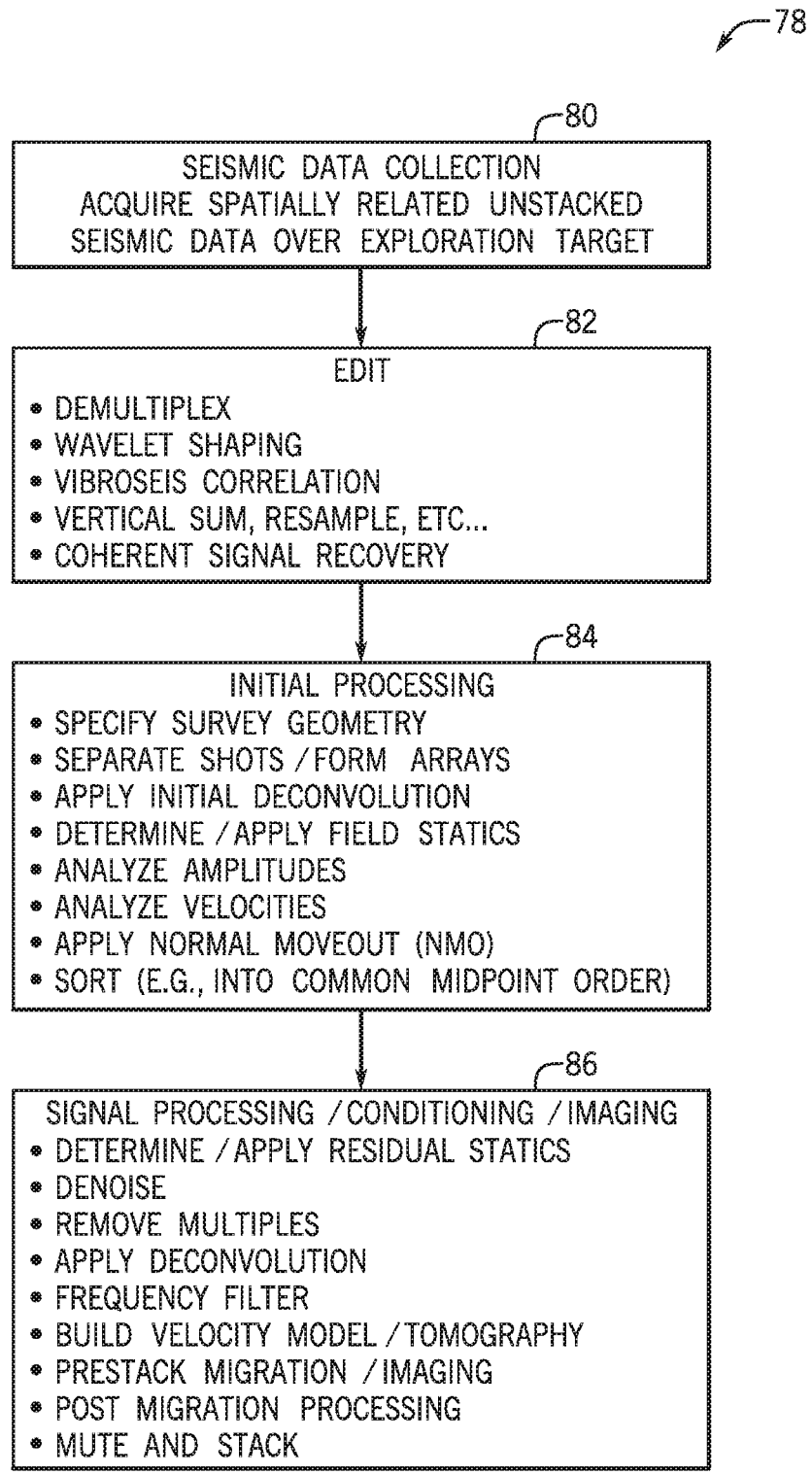
FIG. 5 illustrates a flow chart of a method for generating a seismic image via the computing system of FIG. 4, in accordance with embodiments presented herein.

In some embodiments, a seismic image may be generated in conjunction with a seismic processing scheme such as, for example, the method 78 illustrated in FIG. 5, by the computing system 60 (and more specifically, the processor 64 operating in conjunction with at least one of the memory 66 or the storage 68). As illustrated, method 78 includes a seismic processing sequence that includes a seismic data collection in block 80, editing of the seismic data in block 82, initial processing in block 84, and signal processing, conditioning, and imaging (which may, for example, include production of imaged sections or volumes) in block 86 prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result of the method 78, location of hydrocarbons within a subsurface region 26 may be identified. As described above, the quality of seismic data may be improved by using the weak coherence signal recovery techniques described herein.

Figure 6:
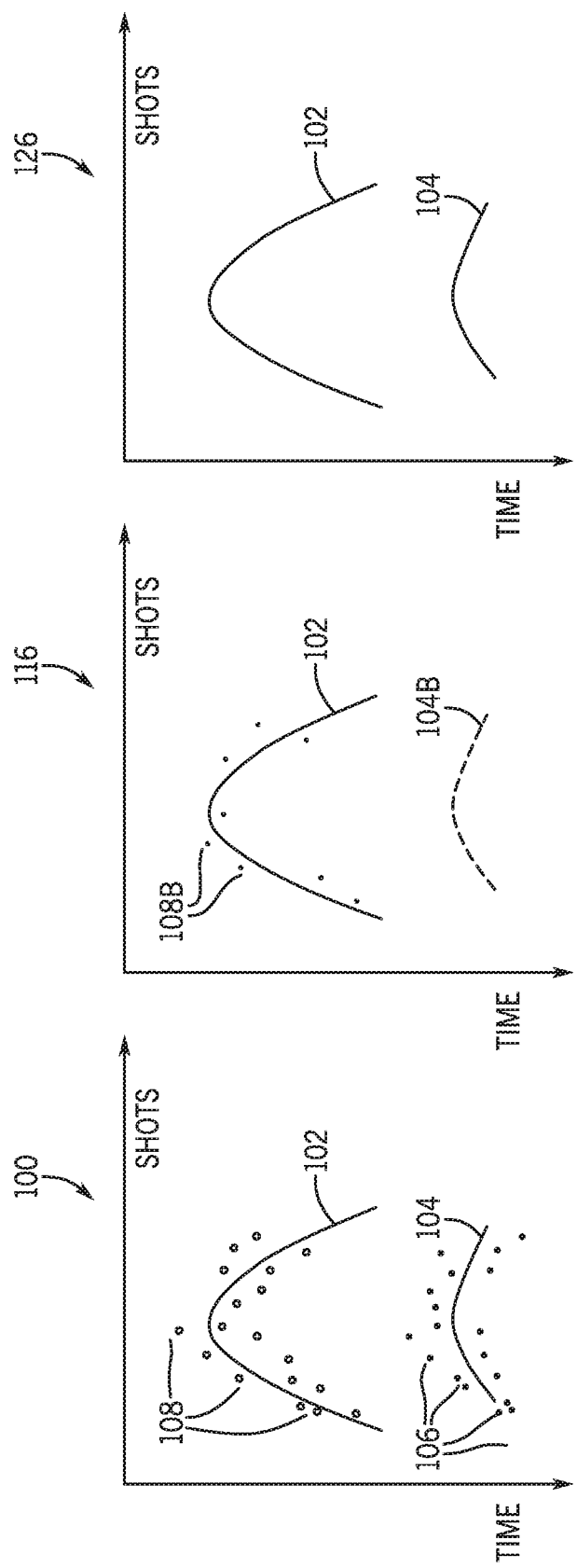
FIG. 6A illustrates a graph depicting a strong primary signal, a weak primary signal, blending noise from the strong primary signal and blending noise from the weak primary signal, in accordance with embodiments presented herein.
FIG. 6B illustrates a graph depicting the strong primary signal of FIG. 6A and the weak primary signal of FIG. 6A separated from the blending noise of FIG. 6A but presented with residual blending noise from the weak primary signal and a deteriorated weak primary signal, in accordance with embodiments presented herein.
FIG. 6C illustrates a graph depicting the strong primary signal of FIG. 6A and the weak primary signal of FIG. 6A separated from the blending noise from the strong primary signal and the blending noise from the weak primary signal of FIG. 6A after recovering the weak primary signal from the residual blending noise of FIG. 6B, in accordance with embodiments presented herein.

FIG. 6A illustrates a graph 100 depicting a strong primary signal 102, a weak primary signal 104, blending noise of the strong primary signal 102 (e.g., blending noise 106), and blending noise of the weak primary signal 104 (e.g., blending noise 108). As described above, these signals may be initially generated by the seismic source 32 or multiple sources at different times. When performing simultaneous source acquisitions of seismic data, the seismic source 32 may transmit a first signal at a first time and the same source or another source may transmit a second signal at a second time (e.g., a time later than the first time).

Although not outputted at the same time, the first signal and the second signal may be transmitted relatively close in time, such that there is a possibility of non-noise signal interference during reception of the first signal due to the reception of the second signal. Thus, sometimes at least a portion of the second signal is received by the receivers 36, 44, and/or 46 when the receivers 36, 44, and/or 46 are expecting to receive the first signal.

In this way, the data gathered corresponding to the first signal may include data corresponding to the second signal. If this occurs, the second signal showing up in the data for the first signal may be considered non-noise signal interference, weak-coherence signals, or blending noise. Since the second signal may be different (e.g., affected by different formations than the first signal) than the first signal, preemptively combining the two signals for data analysis may be improper and can subsequently cause interference in the data recovered for the signal transmitted at the first time.

Excluding the noises generated by the background or equipment, the seismic recording is the sum of primary signals with different time windows from original input data. While predicting the primary signals for each time window, the errors in one time window may cause errors in other overlapping windows since the sum is fixed. Thus, predicting the blending noise may be as beneficial to signal analysis as predicting the coherent primary signals.

To help illustrate, the strong primary signal 102 may correspond to data gathered corresponding to the primary signal of multiple seismic source excitations (namely shots) that travel through one or more features inside earth and return to a receiver. For example, the seismic source 32 may have transmitted the first signal at a first time, and, at a later time, the receivers 36, 44, and/or 46 may have received data corresponding to the first signal. Before the receiver 36, 44, and/or 46 complete recording the first signal, the same seismic source 32 or a different source may transmit another signal and get recorded. The receivers 36, 44, and/or 46 may continue to record until at least a portion of the shots (e.g., some shots, many shots, all shots) have been recorded. Shifting the continuous recording to align the time zeros to the times of seismic source excitations may generate the gather data (commonly called a common receiver gather or a gather, but herein referred to as "gather") depicted in the graph 100. Data gathered includes the strong primary signal 102 (e.g., the actual signal associated with the main response of the signal from the seismic sources and multiple excitations toward one or more features or formations being analyzed as part of the seismic data collection, coherent signal), the weak primary signal 104 (e.g., coherent energy related to a deeper subsurface features with weaker amplitude), the blending noise 106 which is the same energy as the strong primary signal 102 except the time zeros are misaligned with respect to when the shots are excited, and the blending noise 108 which has the same energy as the weak primary signal 104 except the time zeros are misaligned with respect to when the shots are excited. The blending noise 106 may overlap with primary signal 104 data that is relatively weak compared to the primary signal 102 data and the blending noise 106.

Sometimes signal processing operations cause the discarding or disregarding of the blending noise 106. However, it may not be desirable to ignore the blending noise 108 and the weak primary signal 104 when isolating the primary signal 102 from the other signals. To isolate the primary signal 102 from the rest of the signals, separation operations may be performed on the gather data. However, these separation operations may inadvertently cause at least a misallocation of the blending noise 106. In this way, valuable seismic data that overlaps with the primary signal 102 and blending noise 106 may be lost when the blending noise 106 is underestimated. For example, the residual of the blending noise may correspond to signal loss at a different time since the blending noise 106 represents the strong primary signal 102, or coherent energy, misplaced and sensed at a different time than expected. The valuable seismic data that overlaps with the strong primary signal 102 and the blending noise 106 may also be lost when the prediction of blending noise 106 is overestimated causing the weak primary signal 104 that overlaps with the blending noise 106 to be lost.

FIG. 6B illustrates the results from the deblending and/or separation operations on the gathered data, in particular FIG. 6B illustrates a graph 116 depicting the strong primary signal 102 and the weak primary signal 104 separated from the other signals of the graph 100. Although the strong primary signal 102 is shown as recovered from the operations, it is not sufficient to merely discard the data associated with the other signals since there may be hidden primary signal data within the other signals, for example, the weak primary signal 104. The hidden primary signal data is to be associated with other primary signal data to facilitate complete data gathering. In this case, the strong blending noise 106 is overestimated, and some of the weak primary energy has leaked into the prediction of strong blending noise 106, which may result in residual blending noise 108B of the weak primary signal 104 and a weakened primary signal 104B. To perform the deblending and/or separation operation with the leaked energy recovered, multiple coherent and non-coherent energies separations in the same domain and/or in different domains are combined via combing, blending, and subtraction with the original blended continuous data during processing iterations, in order to suitably recover primary signals from other signals, such as the blending noise 108B. It should be noted that the residual noise is not derived exclusively from the weak primary signal 104, for example, strong blending noise 106 may also have residual noise which may be treated with the same techniques described herein.

FIG. 6C illustrates a graph 126 depicting the strong primary signal 102 and the weak primary signal 104 separated from the blending noise 106 and the blending noise 108. The weak primary signal 104 may include the residual blending noise 108B. This may be achieved by the recovery of residual blending noise 108B in FIG. 6B. Before using the techniques described herein, the leakage of the weak primary signal 104 into the blending noise 106 (or the leakage of the blending noise 108 into strong primary signal 102) accumulate after iterations of deblending, or separation operations, and may cause signal loss. However, using the modified recovery techniques, the residual blending noise 108B may be separated from the strong primary signal 102 and further returned to the weak primary signals 104 originally associated with the residual blending noise 108B.

Figure 7:
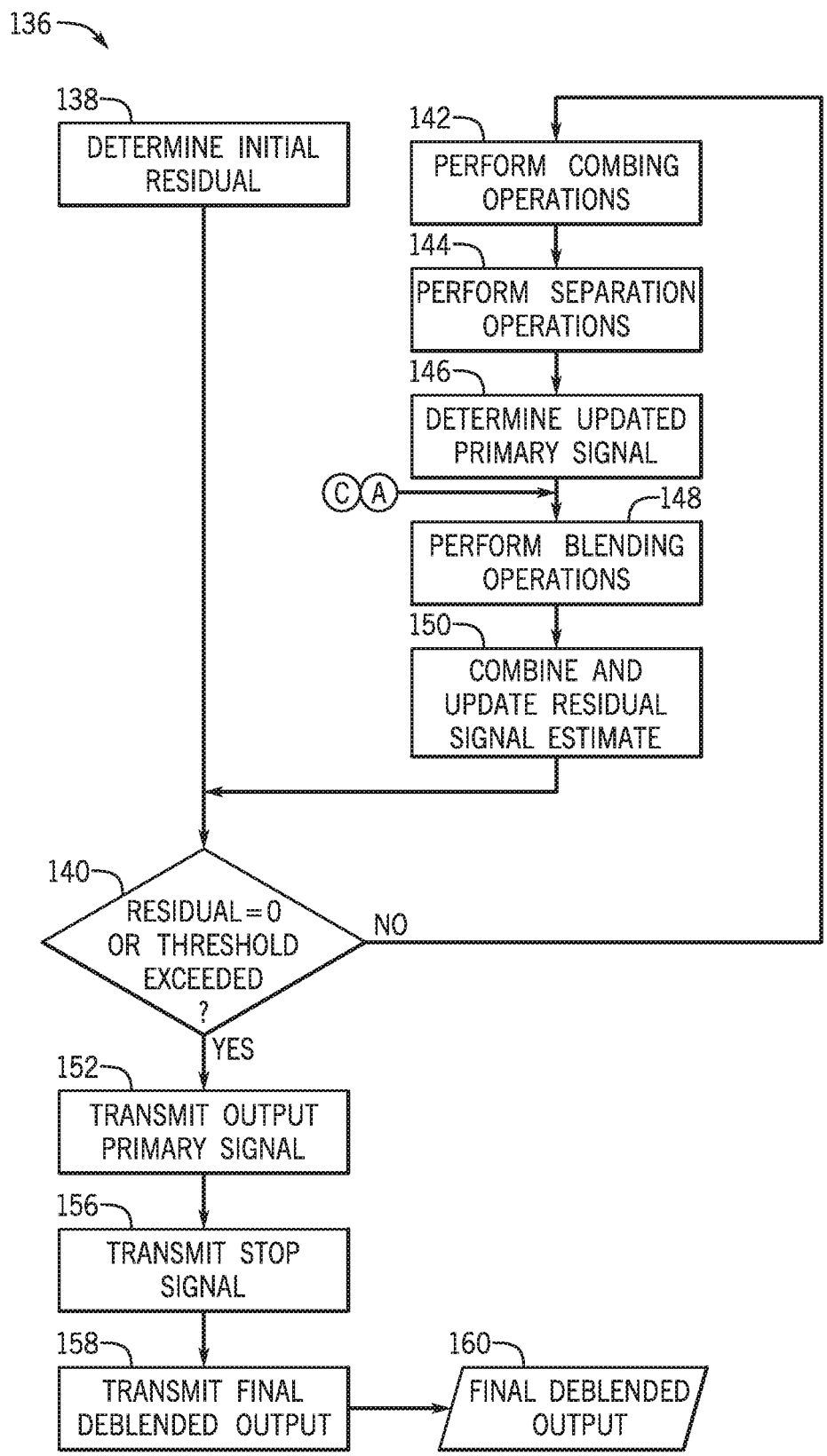
FIG. 7 illustrates a flow chart of a method for inversion-based deblending operations, in accordance with embodiments presented herein.

FIG. 7 illustrates a flow chart of a method 136 for inversion-based deblending operations. Although the following description of the method 136 is detailed in a particular order to facilitate explanation, it should be noted that the operations of the method 136 may be performed in any suitable order. Moreover, although the method 136 is described as being performed by the computing system 60, it should be understood that the method 136 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64, for example, executing code, instructions, commands, or the like stored in the memory 66 (e.g., a tangible, non-transitory, computer-readable medium).

At block 138, the computing system 60 may determine an initial residual. The residual may be considered a difference between expected input data and input data actually received at the receiver (e.g., receivers 36, 44, 46). The input data may be based upon received seismic data. In this way, the residual may indicate a difference between expected input data and the input data manifested within the received seismic data. At the initial stage, the initial residual may be determined using initialized original blended continuous data (e.g., original data) received from receivers during seismic sensing operations. The initialized original blended continuous data may represent data received by receivers after using seismic sensing but before any processing is performed. The continuous residual data may be combed (e.g., slicing time windows from the continuous data with the first time window occurring at the firing time of the shots) into a two-dimensional, three-dimensional, or higher dimensions gather. The primary signals may be spatially coherent in the gather since the time at which the shots of the recorded signals were fired is the same as the start time of the time windows and the shots are regularly sampled spatially. It should be noted that the spatial coherency may still be achieved even when the shots are not regularly sampled, such as by regularizing the shots to a desired grid. However, the non-noise signals (e.g., weak-coherence, blending noise) may not be coherent spatially in the gather since the time at which the shots of the recorded signals were fired is not the same as the start time of the time windows. The coherent signals or coherent energies may have same or substantially similar phases, frequencies, amplitudes, or other seismic coherence properties such that if combined, coherent signals may constructively add. Furthermore, coherency may generally indicate continuity or similarities between seismic traces during a specified time window. As such, coherent signals are generally continuous over a particular time frame while non-coherent signals are considered generally non-continuous over the same time frame. Classifying the residual into coherent signals and non-coherent signals may facilitate improvement of the analysis of the input data by permitting isolation of the blending noise from the primary signals, thereby focusing the analysis of the input data on the data of interest.

At block 140, the computing system 60 may determine whether the initial residual equals zero or whether an iteration count threshold is met (e.g., an iteration threshold associated with a maximum number of times the value of the residual may be iteratively updated). If the residual equals zero, the original data may be considered completely deblended. However, if the residual does not equal zero, the computing system 60 may perform various processing operations to try to adjust the residual value to zero. The computing system 60 may iteratively process the original data to generate the residual value of zero and continue onto determine a final deblended output. However, this may take more than one iteration of processing. At each iteration, an iteration count may increase by one or another suitable increment (or decrement, in some embodiments). Thus, at the block 140, the computing system 60 also may check to see if the iteration count threshold is met, or whether the iteration count exceeds a threshold number of iterations to be performed. Before performing operations associated with blocks 142-150 (e.g., block 142, block 144, block 146, block 148, block 150), the iteration count equals zero, where the iteration count threshold may not equal zero. Even if the residual is not zero, if the iteration count threshold is met, the computing system 60 continues onto the block 152 to continue the method 136. This helps to cap processing resources spent by the computing system 60 on making the residual a suitable amount (e.g., residual=0).

In response to the residual not equaling the suitable amount, such as zero, or in response to the iteration count threshold not being met, the computing system 60, at blocks 142-150, may perform processing operations to attempt to adjust the residual to a more favorable or more desirable amount (e.g., a lower value), which are described in more detail below. Upon completion of processing, the iteration count may change to represent a total number of iterations performed so far and the computing system 60 repeats the determination of whether updated residual estimate equals zero or whether the iteration count now meets a threshold (e.g., iteration count now equals one). When the computing system 60, at the block 140, determines that either the residual (e.g., initial residual or the updated residual estimate) equals zero or the iteration count threshold is met, the computing system 60 proceeds in the method 136 to block 152. In this way, the method 136 represents, at least in part, an iterative process that generally is to be performed over a series of iterations.

Referring back to the blocks 142-150, at the block 142, the computing system 60 may perform combing operations. The combing operations may generate a combed residual that is used in the operations at the block 144. The combing operations may include using a comb filter or performing comb filtering. Comb filtering may be performed by slicing a time window from the continuous recording for a given shot (named a trace from the given shot) with the start time of the window being the time of seismic source excitation of the given shot, repeating the slicing operation for every shot, and sorting the traces based on desired shot grid. Further details regarding combing operations are discussed in paragraphs describing at least FIG. 4, FIG. 5, FIG. 6, and FIG. 7 of the copending, commonly-assigned U.S. patent application Ser. No. 12/542,433, issued as U.S. Pat. No. 8,295,124 on Oct. 23, 2012, which is hereby incorporated by reference herein in its entirety.

At the block 144, the computing system 60 may perform separation operations to estimate the primary signals. It may be desired that the primary signals are extracted in the separation operation, however, it is likely that during the separation some blending noise, or weak-coherence signals are unintentionally leaked into the estimated primary signals, in particular weak non-noise signals. This is because the weak-coherence signals may be considered leakage/error of the separation operation and thus may not be intended to be added to the estimated primary signal. Any suitable signal-noise separation techniques (e.g., frequency-space (f-x) predictive deconvolution, frequency-space (f-x) deconvolution, frequency-space (f-x) thresholding, frequency-wavenumber (f-k) thresholding, singular value decomposition (SVD), or the like) may be used to separate the primary signals from the residual energy. Different methods may be used to determine the updated primary signal as are discussed below with respect to FIG. 8 and FIG. 9. It should be noted that the separation operations at block 144 may also be applied on the sum of the combed residual from block 142 and the primary signal estimate from a previous iteration.

At the block 148, the computing system 60 may perform blending operations. The blending operations may generate blended continuous data (e.g., expected input data) based on the estimated primary signal. The blending operations can involve adding a delayed version of a signal to itself causing some signal interference. At the block 150, the computing system 60 combines and updates the residual signal estimate based at least in part on the blended continuous data generated at the block 148. The blended continuous data may be multiplied by a constant (e.g., −1) and combined with the original blended continuous data such that a residual based on the signal (e.g., separated from the non-noise signal interference) from the original blended continuous data may be used as the residual in the next iteration. The updated residual estimate is compared by the computing system 60 at the block 140 to a zero value to determine whether the residual has been eliminated and thus whether the iterative calculations are to continue. It should be understood that the residual may be compared to any suitable value to determine when the residual has reached a desired value.

Thus, referring now to the block 140, the computing system 60 may repeat a determination whether the residual (e.g., updated residual estimate) equals zero or the iteration count threshold is met. In response to the residual equaling zero or the iteration count threshold being met, the computing system 60 proceeds to the block 152. At the block 152, the computing system 60 transmits an output primary signal. The output primary signal is data representative of a primary energy of the data received by receivers without noise or with a reduced amount of noise.

In some embodiments, at block 156, the computing system 60 may transmit a stop signal. The stop signal may be received and/or used to halt updating operations associated with the block 146. Since the primary signal is no longer used in generating the output primary signal, the primary signal estimate is not to be updated again to be used in determining a new residual. It should be noted that the updating operations may resume when the method 136 is repeated to determine an additional primary signal associated with a different data set.

At the block 158, the computing system 60 may transmit a final deblended output 160. The final deblended output 160 may be considered the result (e.g., computational result, calculated result, determined result) of the method 136. The final deblended output may be used for further signal processing as described in FIG. 5 above, such as in operations at the block 82 or at the block 84 of FIG. 5.

Figure 8:
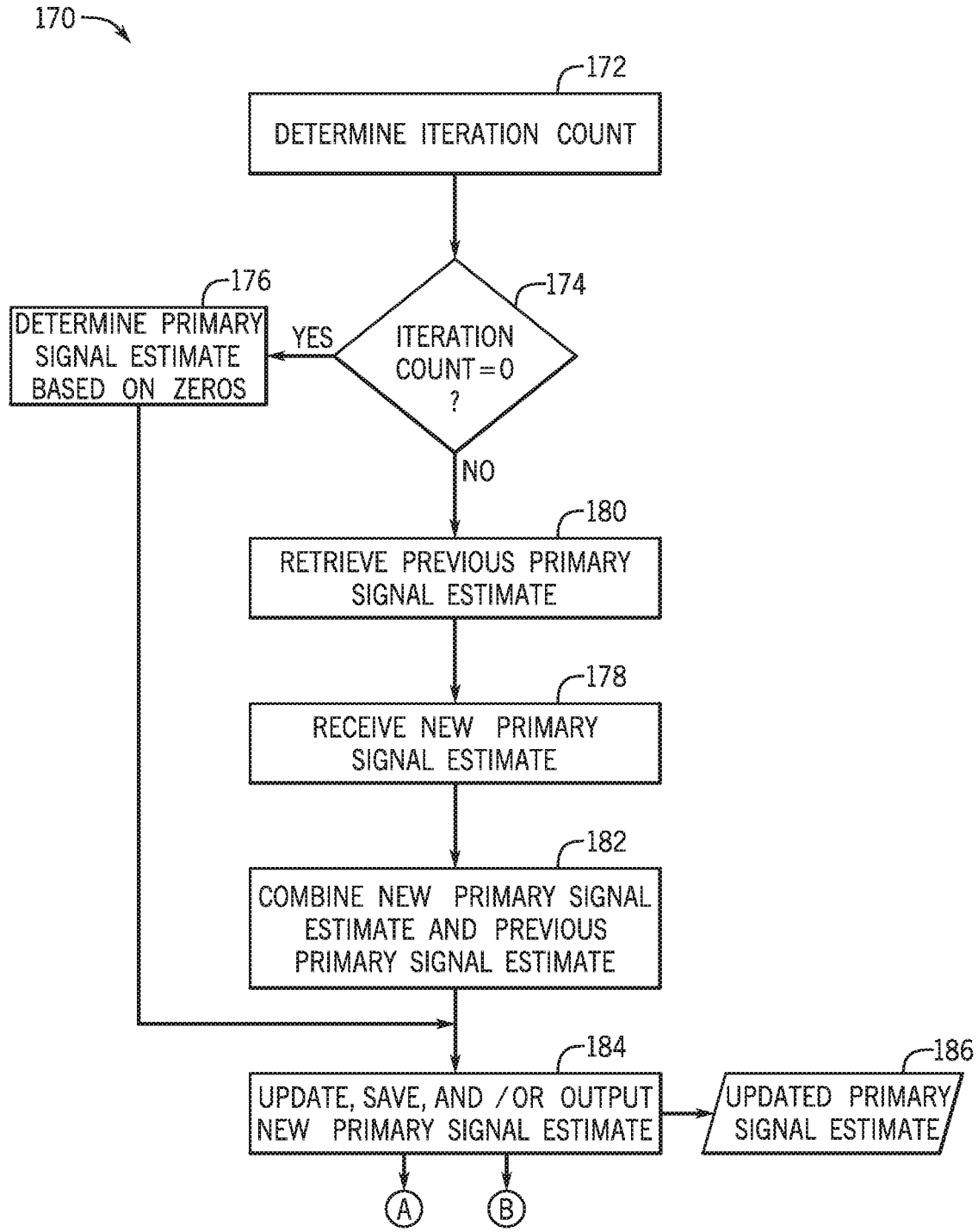
FIG. 8 illustrates a flow chart of a method for determining an updated primary signal associated with the method of FIG. 7, in accordance with embodiments presented herein.
Figure 9:
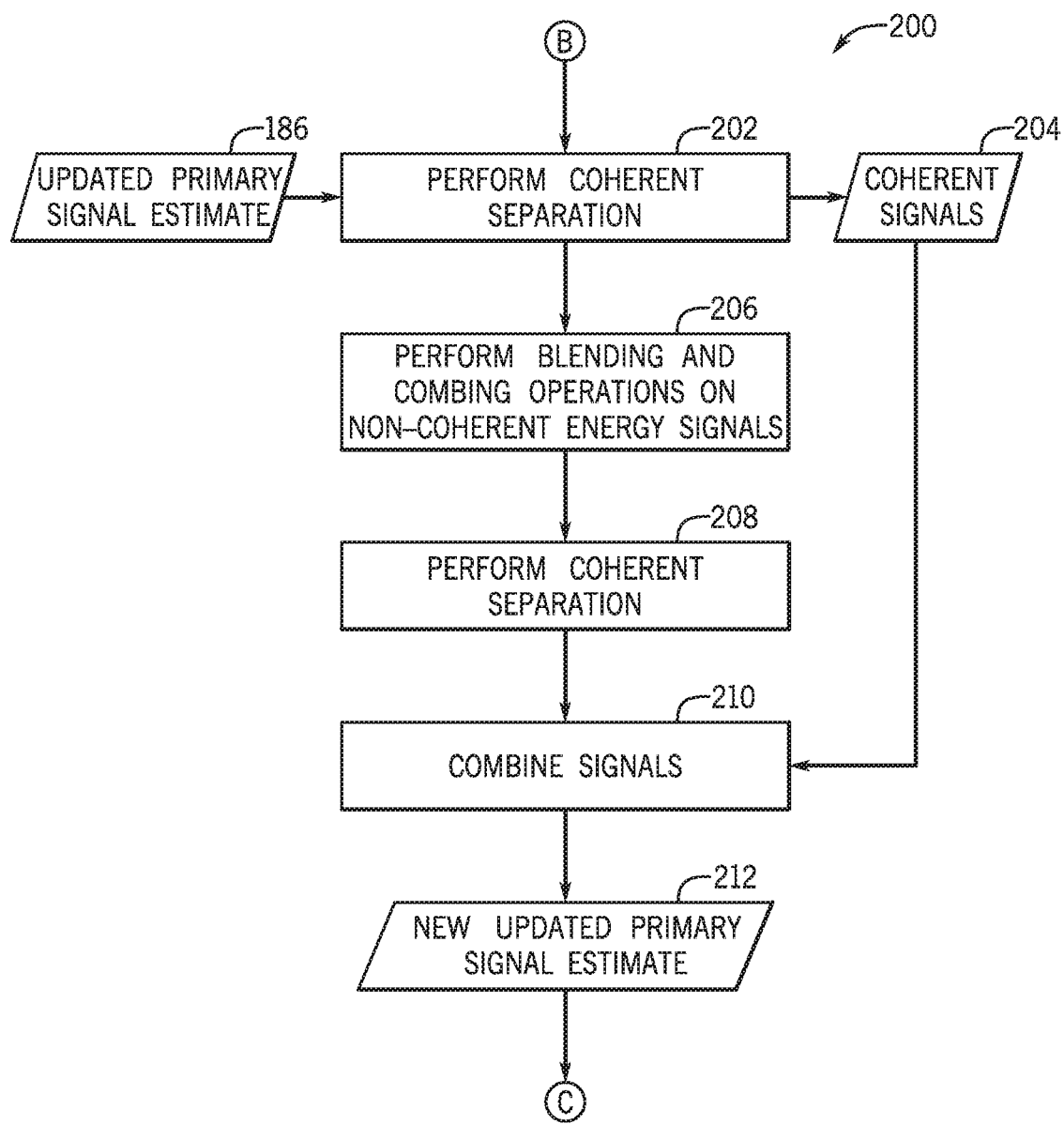
FIG. 9 illustrates a flow chart of an embodiment of the method of FIG. 8 for an improved method of determining an updated primary signal associated with the method of FIG. 7, in accordance with embodiments presented herein.

As described above, the computing system 60 may leak the weak-coherence signals in its determination of the updated primary signal, where the weak-coherence signals are unintentionally leaked into the estimated primary signals. FIG. 8 and FIG. 9 illustrate a flow chart of an example method 170 for determining an updated primary signal associated with the method of FIG. 7 at the block 146, to recover the signals lost due to the leakage. It should be understood that FIG. 8 and FIG. 9 merely depict an example method to be used to perform operations described at the block 146, therefore other suitable methods, process, or procedures may be used to also perform operations described at the block 146. Although the following description of the method 170 is detailed in a particular order to facilitate explanation, it should be noted that the operations of the method 170 may be performed in any suitable order. Moreover, although the method 170 is described as being performed by the computing system 60, it should be understood that the method 170 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64, for example, by executing code, instructions, commands, or the like stored in the memory 66 (e.g., a tangible, non-transitory medium).

At block 172, the computing system 60 may determine a current iteration count. The iteration count, as described above, is updated alongside the updating of the residual estimate. If the computing system 60 is determining the iteration count for the first time (e.g., the first time meaning that a complete iteration has yet to be performed and the residual has yet to be updated beyond the initial residual value determined at the block 138), the iteration count is equal to a starting value, such as zero (e.g., iteration count=0).

Thus, at block 174, the computing system 60 may determine whether the iteration count equals zero. If the iteration count equals 0, the computing system 60 proceeds to block 176 to determine a primary signal estimate corresponding to a zero array (e.g., a data structure or data array including null values, empty traces) or by means of some other suitable initialization technique to initialize a primary signal estimate. After determining the primary signal estimate, the computing system 60 proceeds to block 184.

However, if the computing system 60 at the block 174 determines that the iteration count does not equal zero, the computing system 60 determines that iterative processing has begun. Thus, the computing system 60 continues onto block 180 to retrieve a previous primary signal estimate. After determining the primary signal estimate, the computing system 60 proceeds to the block 178 to generate a new primary signal estimate. The computing system 60 may continue the method 170 using the new primary signal estimates to update the previous primary signal estimate based on the coherence-based separation operation.

At the block 178, the computing system 60 may receive the new primary estimate generated at the block 144 of the method 136 in response to the separation operations. In this way, the non-coherent noise, the weak-coherence signals, and the remaining primary signals may be retained for future computation.

At block 182, the computing system 60 may combine the new primary signal estimate and the previous primary signal estimate. The computing system 60 may use additional circuitry or processing circuitry programmed to add values to weight and combine the new primary signal estimate and the previous primary signal estimate. It should be understood that although described as addition, any suitable combinational method may be used based on the embodiment, for example multiplication, division, subtraction, or the like. The result of the computation is considered a primary signal estimate.

After combining the values, at block 184, the computing system 60 may update, save, output, or the like the new primary signal estimate as updated primary signal estimate 186. The updated primary signal estimate may be any suitable type of data and may be outputted at block 152 of the method 136 upon the computing system 60 making a suitable determination at the block 140 of the method 136. The saved primary signal estimate may be retrieved from memory 66 to be referenced in later-preformed iterations based on the same initialized original blended continuous data to facilitate performing iterative determinations of the primary signal estimate. After determining the primary signal estimate, the computing system 60 may resume performing the method 136 depicted in FIG. 7, such as at the block 148 to perform blending operations.

When performing the above-described operations, deblending operations assume that non-noise signals (e.g., weak-coherence signals, blending noise) is not coherent in space while the signal to be deblended is coherent in space. In other words, the assumption is made that there is a clear distinction between non-coherent energy (e.g., presumably noise) and coherent energy (e.g., presumably signal). Furthermore, an additional assumption includes assuming that when signals are separated during the above-described iterations, no blending noise is carried with the signals (e.g., primary signals estimated from the combed residual at the block 144 of FIG. 7 do not include any blending noise and may be valid signal). This causes deblending operations to be inaccurate since weak-coherence signals may be interpreted as non-coherent with respect to the primary signal, then leaked into the strong-coherence primary signals.

FIG. 9 illustrates a flow chart of a method 200 of determining an updated primary signal associated with the method 136 of FIG. 7 using the output of the method 170 of FIG. 8. The weak-coherence signals which leak into primary signal estimate at the block 144 of the method 136 in response to the separation operations, may be recovered to be placed back to the correct time window for the corresponding shot to the weak-coherence signals. Including this method with the performance of the method 136 of FIG. 7 and FIG. 8 may improve seismic data processing and make achievable the assumption that less blending noise is carried with the signals during signal-noise separation. It should be understood that FIG. 9 merely depicts an example method to be used to perform operations described at the block 146 of FIG. 7, therefore other suitable methods, process, or procedures may be used to also perform operations described at the block 146. Although the following description of the method 200 is detailed in a particular order to facilitate explanation, it should be noted that the operations of the method 200 may be performed in any suitable order. Moreover, although the method 200 is described as being performed by the computing system 60, it should be understood that the method 200 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64, for example, executing code, instructions, commands, or the like stored in the memory 66 (e.g., a tangible, non-transitory medium).

Continued from the block 184 of FIG. 8, the computing system 60, at block 202, may perform coherent separation operations on the updated primary signal estimate 186. At this point, the computing system 60 may filter out seismic energy that is non-coherent in deblended signal by using random noise removal processes, such as frequency-space (f-x) predictive deconvolution, vector median filter, or any other suitable means of random noise removal. Resulting from these operations are outputs including coherent signals 204, or signals associated with coherent energy, and non-coherent signals, or signals classified as being associated with noise or interference. In general, coherence refers to a statistic that may expose a relationship between two signals or two data sets and may be used to determine a relationship between an input and an output, which thus may be applied to determine whether particular signals are noise. The non-coherent signals may include blending noise, thus signal recovery operations are to be performed to recover any relevant signals (e.g., additional coherent signals) from the non-coherent signals.

Thus, to facilitate recovering coherent signals from the non-coherent signals, the computing system 60, at block 206, may perform blending and combing operations on the non-coherent signals from the block 202. Here, the non-coherent signals are blended into continuous data by sliding the time windows having respective shot times and adding the time windows together. The combing operation may convert the summed continuous data back to the gathers of time windows. The gathers are to be processed to facilitate signal-noise separation operations.

At block 208, the computing system 60 may perform the coherent separation operations again on the non-coherent signals after the blending and combing operations. In some cases, coherent signals may be leaked into non-coherent signals that result from the coherent separation operation performed at block 202. As part of the blending and combing operations performed on the non-coherent signals from block 202, in these cases, the non-coherent signals are to be separated from the combed gather generated at block 226. The computing system 60 therefore repeats the noise removal processes, such as frequency-space (f-x) predictive deconvolution, vector median filter, singular value decomposition or any other suitable means of noise removal. The coherent separation operations of the block 208 may be applied on a different dimension or using different techniques or using the same techniques but different parameterization when compared to the block 144 and block 202. For example, the separation operations at block 144 may use three-dimensional regularization and frequency-wavenumber (f-k) transform, while the separation operations at block 202 may use two-dimensional regularization and a vector median filter, and the separation operations at block 208 may use two-dimensional regularization and a frequency-space (f-x) predictive deconvolution. Repeating the coherent separation operations permits the computing system 60 to separate additional coherent signals from the overall non-coherent signals in the primary signal estimate (e.g., signals classified as non-coherent). The computing system 60 uses the resulting coherent signals at block 210 and may discard or disregard the resulting non-coherent signals.

At the block 210, the computing system 60 may combine the resulting coherent signals from the coherent separation at the block 208 with the resulting coherent signals 204 from the coherent separation at the block 202. If the deblending performed using the method 170 of FIG. 8 is doing a suitable job, the blended and combed result from block 206 remains non-coherent, thus no signals are generated at the block 208 and combined with the coherent signals 204. However, if there were coherent signals within the blended result at the block 206, the coherent signals have been misplaced and may be captured and recombined with the coherent signals 204. The coherent signals determined at the block 208 and the coherent signals 204 are added (or otherwise summed after being adjusted via a modifying weight) together with the resulting non-coherent signals generated at block 202 with a weight. The resulting combination of the coherent signals becomes the new updated primary signal estimate 212. It noted that when method 200 is performed iteratively, one or more extracted (e.g., iteratively extracted) coherent signals that were misplaced may be combined at this portion to determine the updated signal estimate, and that any suitable number of iterations of blocks 202, 206, and 208 may be included in the method 200. The computing system 60 may track iterations and end iterative performance of at least a portion of the method 200 in response to a threshold parameter being met and/or exceed. This end condition (e.g., exceeding the threshold parameter) may indicate a suitable number of iterations. The end condition may be iteration threshold associated with a maximum number of times a value of the residual may be iteratively updated. The computing system 60 may continue at the block 148 of FIG. 7 to perform blending operations using the new updated primary signal estimate 212. Upon the computing system continuing the method 136 after performing the method 200, the final deblended output 160 may include one or more previously misplaced signals that have been captured (e.g., recovered) and recombined with initially identified coherent signals associated with a primary signal estimate.

Figure 10:
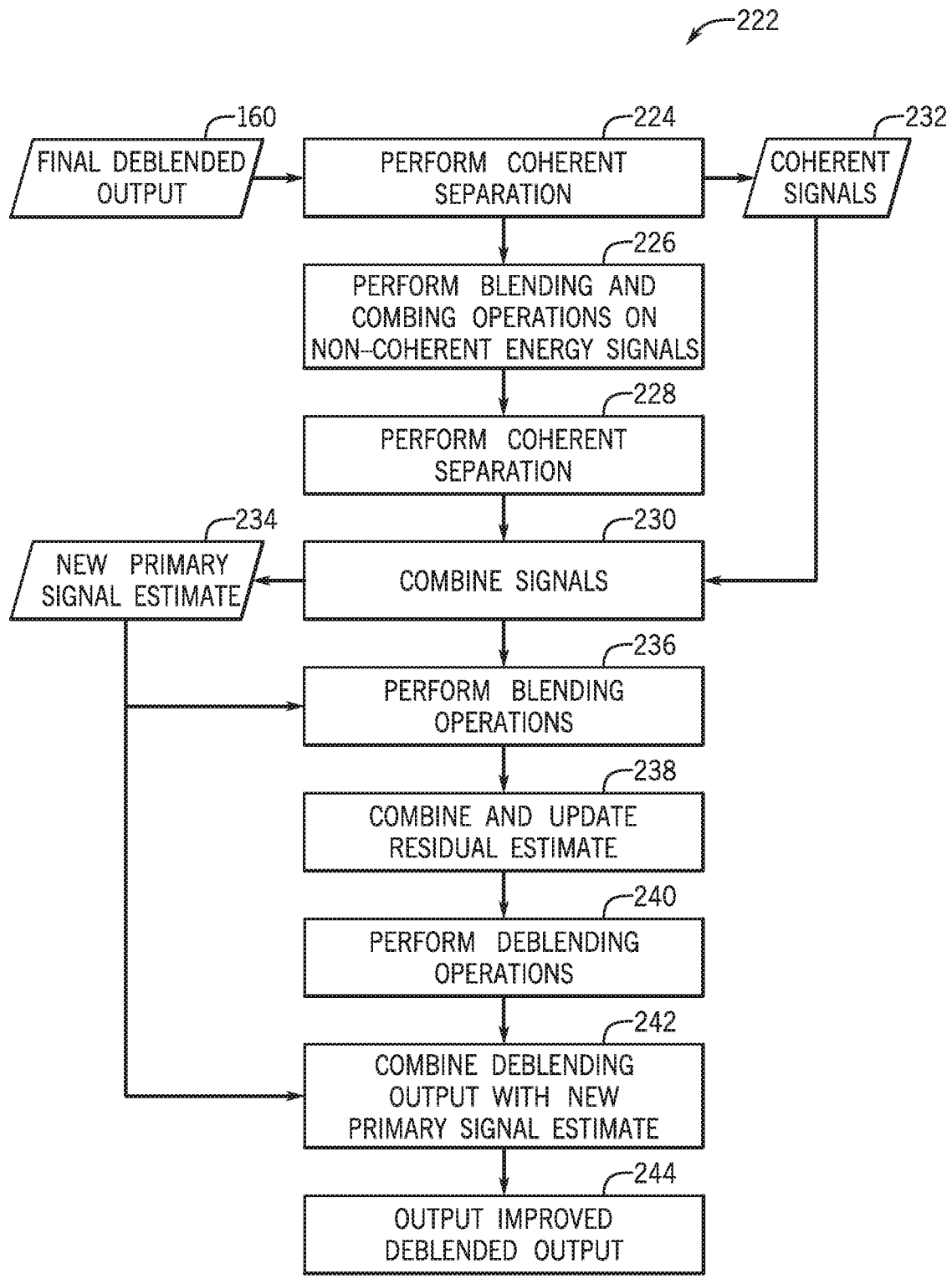
FIG. 10 illustrates a flow chart of a method to determine an updated deblending signal that performs at least in part some of the recovery and deblending techniques described herein, in accordance with embodiments presented herein.

FIG. 10 illustrates a flow chart of a method 222 to determine an updated deblending signal that performs at least in part some of the recovery and deblending techniques described above with respect to FIG. 9. The method 222 describes a process that may be retrofitted onto existing processing and capturing systems to improve the final deblended output 160. This retrofitting may be permitted by using one or more processors or computing systems in addition to the computing system 60, such that the additional computing systems may receive outputs from the computing system 60 to perform the overall method. Although two or more processors or computing systems may be used, one computing system 60 is described herein as performing the method 222. Although the following description of the method 222 is detailed in a particular order to facilitate explanation, it should be noted that the operations of the method 222 may be performed in any suitable order. Moreover, although the method 222 is described as being performed by the computing system 60, it should be understood that the method 222 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64, for example, executing code, instructions, commands, or the like stored in the memory 66 (e.g., a tangible, non-transitory medium).

At block 224, the computing system 60 may receive the final deblended output 160 from the block 158 of FIG. 7 and perform coherent separation described at the block 224 of FIG. 9. For ease of discussion, discussion regarding details about the coherent separation performed at the block 224 of FIG. 10, the blending and combing operations performed at block 226 of FIG. 10, and the repeating of the coherent separation at block 228 of FIG. 10 from above are relied upon herein since some processes are the same between the method 222 and the method 200 of FIG. 9. Thus, at the block 226, the computing system 60 may perform blending and combing operations on the resulting non-coherent signals from the coherent separation at the block 224. In some cases, coherent signals may be leaked into non-coherent signals that result from the coherent separation operation performed at block 224. As part of the blending and combing operations performed on the non-coherent signals from block 224, in these cases, the non-coherent signals are to be separated from the combed gather generated at block 226. At the block 228, the computing system 60 may repeat performance of the coherent separation (e.g., coherent separation of block 224) on the blended and combed output from the block 226. At this point, the computing system 60, at block 230, may combine coherent signals 232 (generated during the coherent separation operations at the block 224), the coherent signals resulting from the coherent separation of the block 228 and the resulting non-coherent signals generated at block 224 to generate a new primary signal estimate 234. The combination may be a straight sum (e.g., not adjusted via a modifying weight value) or weighted sum (e.g., adjusted via a modifying weight value). The new primary signal estimate may be used when performing blending operations, at block 236, in a manner similar to the discussion earlier with regard to the block 148 of FIG. 7.

The computing system 60, at block 238, may combine the outputted blended continuous data of estimated primary signal with the original blended continuous data, as described earlier with respect to the block 150 of FIG. 7. In some embodiments, the outputted blended continuous data is multiplied by a negative constant (e.g., −1) to adjust the value of the data before being combined with the original blended continuous data.

At block 240, the computing system 60 may perform deblending operations using the residual output from the block 238. The deblending operations may facilitate separating blending noise from noise signals within the residual estimate outputted from the block 238. The weak coherence signals generated at block 240 may be combined (e.g., additively combined) with the new primary signal estimate 234 at block 242. Any suitable method or means of combining the signals may be used, including processing circuitry that operates to add signal values together. It should be noted that the deblending operation in block 240 may be replaced by weighting the residual output from the block 238 with a blending fold (e.g., at any given time, a number of seismic shots within an effective time window being recorded) or variations of the blending fold, such that blending the weighted residual output from block 240 generates the residual output from block 238.

After combining the weak coherence signal generated at block 240 and the new primary signal estimate 234, at block 244, the computing system 60 may output an improved deblended output that includes results of a single iteration of deblending signal recovery operation. In this way, the improved deblended output may include at least some weak coherence signal that previously, such as when using the final deblended output, was previously leaked into other coherent signals. Thus, this final deblended output may include one or more previously misplaced signals that have been captured (e.g., recovered) and recombined with initially identified coherent signals associated with a primary signal estimate. The output of block 244 may be the input (e.g., block 160) of block 224 if additional weak coherence signals are able to be recovered.

In this way, a second processor may update the value of the residual after determining a final deblended output as part of the above-described retrofitted operations performed in addition to one or more operations (e.g., that may be performed by a first processor and/or performed by software, an application, for the like), such that a final deblended output of the one or more operations are improved. The second processor may output an improved deblended output as the deblended output at the block 244. This improved deblended output may include at least some recovered coherent signals from the noise signals associated with the final deblended output 160, such as the final deblended output 160 outputted at the block 158.

Using the methods described in FIG. 9 and FIG. 10, various geometry issues may also be resolved. For example, shots transmitted by seismic sources (e.g., seismic source 32, seismic source 40) may not be returned in a periodic or regular pattern. For example, some shots may be received having a first interval (e.g., 0.5 meters) and some shots may be received having a second interval (e.g., 1.5 meter), or multiple shots fall on the same grid point despite the difference between their locations. Using the above-described methods of FIG. 9 and FIG. 10 permits correction to these intervals such that the intervals may be corrected (e.g., to 1 meter) since the coherence separation operations in FIG. 9 or FIG. 10 may permit improved tolerance on geometry issues.

Technical effects of this disclosure include designs and methods for reducing weak coherence signals discarded and misallocated to other coherent signals during seismic data processing. In particular, the disclosed methods and data editing techniques include processes for recovering, at least in part, weak coherence signals misplaced during seismic processing, permitting a re-association of misplaced coherent signals (e.g., previously concealed inside other coherent signals) with other coherent signals from a same source that may not be the source of focus during seismic data collection. These recovery operations may cause improved data inputs into seismic image generators. When data inputs into the seismic image generators are improved, the resulting seismic image may also improve, causing an improvement of a representation of hydrocarbons in a subsurface region of Earth or of subsurface drilling hazards.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
    determining a residual associated with input seismic data, wherein the residual indicates a difference between an expected input seismic data and the input seismic data, wherein the expected input seismic data is determined by blending estimated primary signals with time shifts applied to the estimated primary signals based on a time of seismic source excitations that generated primary signals, and wherein a primary signal estimate is initialized;
    iteratively updating a value of the residual based at least in part on separation operations, wherein the separation operations are configured to filter coherent signals, associated with either residual data or a sum of the residual data and a current primary signal estimate, into a first subset of signals, and wherein the separation operations are configured to filter non-coherent signals associated with the residual data into a second subset of signals;
    generating additional coherent signals with correct timing from misplaced signals within the first subset of signals, at least in part by iteratively extracting and re-allocating a non-coherent part or a less-coherent part of the first subset of signals; and
    in response to satisfying an end condition, transmitting a deblended output that is determined based at least in part on the first subset of signals and the additional coherent signals and that is for use in generating a seismic image, wherein the seismic image represents hydrocarbons in a subsurface region of Earth or subsurface drilling hazards.

2. The method of claim 1, wherein iteratively updating the value of the residual based at least in part on the separation operations, comprises:
    separating the residual or the sum of the residual data and the current primary signal estimate via the separation operations to generate the first subset of signals and the second subset of signals;
    determining an updated primary signal estimate based at least in part on a current iteration count, wherein the updated primary signal estimate is configured to identify a coherent energy for a particular input seismic data collection period; and
    generating the deblended output based at least in part on the updated primary signal estimate.

3. The method of claim 2, wherein the deblended output is the updated primary signal estimate, or a weighted sum of the updated primary signal estimate and a primary signal estimate from previous iterations.

4. The method of claim 1, wherein iteratively updating the value of the residual based at least in part on the separation operations comprises:
    receiving the first subset of signals used to estimate a coherent energy for a particular input seismic data collection period; and
    separating the first subset of signals into a third subset of signals and a fourth subset of signals, wherein the third subset of signals corresponds to coherent energy of the first subset of signals, and wherein the fourth subset of signals comprises noncoherent or less-coherent energy of the first subset of signals indicative of misallocated primary signals.

5. The method of claim 4, wherein the deblended output is generated based at least in part on combining the first subset of signals, the third subset of signals, and a fifth subset of signals, wherein the fifth subset of signals are extracted from the misallocated primary signals of the fourth subset of signals.

6. The method of claim 5, further comprising extracting the fifth subset of signals from the misallocated primary signals in the fourth subset of signals by:
    blending the fourth subset of signals into a continuous data recording with time shifts applied to the signals based on the time of seismic source excitations to generate the signals;
    combing the blended continuous data into a gather of data collection periods to generate combed gather data;

subtracting the fourth subset of signals from the combed gather data, wherein coherent signals are leaked into the fourth subset of signals to generate subtracted gather data; and performing the separation operations on the combed gather data or the subtracted gather data to obtain the re-allocated coherent energy as the fifth subset of signals.

7. The method of claim 5, wherein updating the value of the residual comprises performing blending operations that use an updated primary signal estimate comprising the third subset of signals, the fourth subset of signals, and the fifth subset of signals.

8. The method of claim 1, wherein the end condition comprises exceeding an iteration threshold associated with a maximum number of times the value of the residual is iteratively updated.

9. The method of claim 1, wherein the deblended output comprises a third subset of signals, a fourth subset of signals, and a fifth subset of signals, wherein the fifth subset of signals correspond to misplaced coherent signals recovered from the fourth subset of signals.

10. A tangible, non-transitory, machine-readable media, comprising instructions configured to cause a processor to:
determine a residual associated with input seismic data, wherein the residual indicates a difference between expected input seismic data and the input seismic data;
determine a deblended output based at least in part on the residual;
update the deblended output based at least in part on a result from performing one or more recovery operations configured to recover coherent signals from a less-coherent part of the deblended output, wherein the coherent signals comprise a matching parameter; and
transmit the deblended output for use in generating a seismic image, wherein the seismic image represents hydrocarbons in a subsurface region of Earth or subsurface drilling hazards.

11. The tangible, non-transitory, machine-readable media of claim 10, wherein the instructions further configured to cause the processor to, as part of the one or more recovery operations:
perform a separation operation on the deblended output to generate a first subset of signals associated with coherent signals of the deblended output and a second subset of signals associated with non-coherent signals of the deblended output;
recover a third subset of signals from the second subset of signals, wherein the third subset of signals comprises the coherent signals of the non-coherent signals of the deblended output; and
update the deblended output based at least in part on the third subset of signals resulting from performing one or more recovery operations.

12. The tangible, non-transitory, machine-readable media of claim 11, wherein the instructions configured to cause the processor to, as part of the one or more recovery operations:
perform blending and combing operations on the second subset of signals to generate combed gather data;
subtract the second subset of signals from the combed gather data, wherein coherent signals are leaked into the second subset of signals to generate subtracted gather data; and
after the blending, combing, and subtraction operations, perform an additional separation operation on the combed gather data or the subtracted gather data to generate the third subset of signals and a fourth subset of signals, wherein the third subset of signals are considered recovered coherent signals, and wherein the fourth subset of signals are considered non-coherent signals.

13. The tangible, non-transitory, machine-readable media of claim 11, wherein the instructions for updating the deblended output further comprise instructions configured to cause the processor to:
generate a primary signal estimate based at least in part on the third subset of signals, the second subset of signals, and the first subset of signals;
compute the expected input seismic data by blending the primary signal estimate with time shifts applied to the primary signals before blending based on a time of seismic source excitations to generate the signals;
generate the residual based at least in part on a difference between the expected input seismic data and original input data;
perform deblending operations on the residual, or divide the residual by a blending fold; and
after performing the deblending operations or the division operations, update the deblended output based on the primary signal estimate and the results from the deblending operations or the division operations.

14. The tangible, non-transitory, machine-readable media of claim 13, wherein the primary signal estimate is generated by additively combining the third subset of signals, the second subset of signals, and the first subset of signals, and wherein the results from the deblending operations or the division operations on the residual.

15. The tangible, non-transitory, machine-readable media of claim 10, wherein the deblended output comprises one or more previously misplaced signals that have been captured and recombined with initially identified coherent signals associated with a primary signal estimate.

16. The tangible, non-transitory, machine-readable media of claim 10, wherein the one or more recovery operations are performed after the deblended output is determined.

17. The tangible, non-transitory, machine-readable media of claim 10, wherein the one or more recovery operations are associated with instructions to cause the processor to:
separate the deblended output into the coherent signals and non-coherent signals;
separate the non-coherent signals into additional coherent signals and additional non-coherent signals;
combine the additional coherent signals and either the coherent signals or the previously deblended output, to update a value of the residual; and
update the deblended output based at least in part on the coherent signals or the previously deblended output, the additional coherent signals, and the updated value of the residual.

18. A device comprising:
a memory configured to store instructions; and
a first processor coupled to the memory and configured to execute the instructions, which cause the processor to be configured to:
determine a residual associated with input seismic data, wherein the residual indicates a difference between expected input seismic data and the input seismic data;
update a value of the residual based at least in part on a separation operation that separates coherent signals from noise signals in an output associated with the residual, wherein the output associated with the residual is a remaining energy for separation or a sum of the residual and a primary signal estimate;

extract non-coherent or weak-coherent energy from the coherent signals;

generate additional coherent signals with correct timing based at least in part on a re-allocation of the non-coherent or the weak-coherent energy;

in response to satisfying an end condition, determine a deblended output comprising the re-allocated non-coherent or weak-coherent energy from the output; and transmit the deblended output for use in generating a seismic image, wherein the seismic image represents hydrocarbons in a subsurface region of Earth or subsurface drilling hazards.

19. The device of claim 18, wherein the instructions further cause the first processor, as part of the generating of the additional coherent signals with correct timing, to be configured to:

extract misallocated energy from the primary signal estimate; and generate coherent signals associated with suitable timing from the misallocated energy at least in part by re-allocating the misallocated energy to the primary signal, wherein updating the value of the residual is configured to be part of an iterative process performed before determining the deblended output, and wherein the iterative process comprises updating, at each iteration, the primary signal estimate to include the additional coherent signals from previously determined coherent but misallocated signals.

20. The device of claim 18, further comprising a second processor configured to update the value of the residual after determining a final deblended output as part of retrofitted operations performed in addition to operations configured to be preexisting, such that the final deblended output is improved, and wherein the second processor is configured to output an improved deblended output as the deblended output, wherein the improved deblended output comprises at least some recovered coherent signals from the noise signals associated with the final deblended output.

* * * * *